(12) United States Patent
Kohei et al.

(10) Patent No.: US 7,730,763 B2
(45) Date of Patent: Jun. 8, 2010

(54) BALANCE CORRECTOR

(75) Inventors: Toru Kohei, Kawasaki (JP); Nobuyoshi Nakayama, Kawasaki (JP); Shigeyuki Kotake, Kawasaki (JP); Keiji Aruga, Kawasaki (JP)

(73) Assignee: Toshiba Storage Device Corporation, Tokyo (JP)

( * ) Notice: Subject to any disclaimer, the term of this patent is extended or adjusted under 35 U.S.C. 154(b) by 399 days.

(21) Appl. No.: 11/650,952

(22) Filed: Jan. 9, 2007

(65) Prior Publication Data

US 2008/0034838 A1    Feb. 14, 2008

(30) Foreign Application Priority Data

Aug. 11, 2006   (JP)   ............... 2006-220476

(51) Int. Cl.
*G01N 3/30* (2006.01)
(52) U.S. Cl. ........................ 73/12.01; 73/461
(58) Field of Classification Search ................ 73/12.01, 73/460–462
See application file for complete search history.

(56) References Cited

U.S. PATENT DOCUMENTS

| | | | |
|---|---|---|---|
| 5,587,855 A * | 12/1996 | Kim | 360/97.02 |
| 5,811,678 A * | 9/1998 | Hirano | 73/461 |
| 6,109,101 A * | 8/2000 | Iwabuchi et al. | 73/462 |
| 6,189,371 B1 * | 2/2001 | Hirano | 73/66 |
| 6,314,077 B1 * | 11/2001 | Shishido et al. | 720/702 |
| 6,690,533 B2 * | 2/2004 | Thia et al. | 360/75 |
| 6,693,757 B2 * | 2/2004 | Hayakawa et al. | 360/69 |
| 6,895,656 B2 * | 5/2005 | Yoshida | 29/603.03 |
| 6,971,154 B2 * | 12/2005 | Yoo et al. | 29/603.03 |
| 2001/0038508 A1* | 11/2001 | Thia et al. | 360/75 |
| 2004/0034992 A1* | 2/2004 | Kato et al. | 29/603.03 |
| 2007/0043347 A1* | 2/2007 | Solomita et al. | 606/33 |
| 2007/0043970 A1* | 2/2007 | Solomita et al. | 714/10 |
| 2008/0037163 A1* | 2/2008 | Kohei et al. | 360/98.08 |

FOREIGN PATENT DOCUMENTS

JP    11-39786    2/1999

* cited by examiner

*Primary Examiner*—Lisa M Caputo
*Assistant Examiner*—Freddie Kirkland, III
(74) *Attorney, Agent, or Firm*—Kratz, Quintos & Hanson, LLP

(57) ABSTRACT

An apparatus that corrects a weight imbalance around an axis of a spindle motor that rotates a disc in a disc drive includes an impact applicator that applies an impact to a housing that houses the spindle motor and the disc, a plate that supports the housing and impact applicator, a spring member that supports the plate, and enables the plate and the housing to vibrate together when the spindle motor rotates, and a detector that detects a vibration of the housing when the spindle motor rotates.

4 Claims, 13 Drawing Sheets

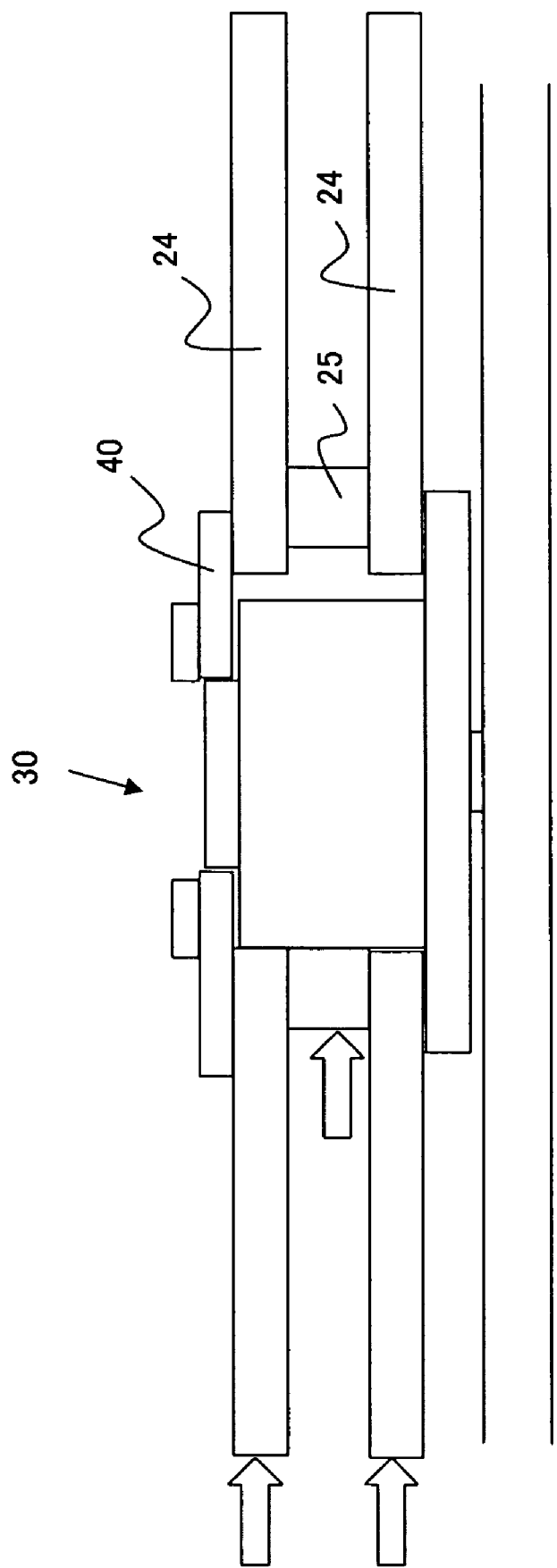

BALANCE CORRECTOR

This application claims the right of a foreign priority based on Japanese Patent Application No. 2006-220476, filed on Aug. 11, 2006, which is hereby incorporated by reference herein in its entirety as if fully set forth herein.

BACKGROUND OF THE INVENTION

The present invention relates generally to an adjustment of driving in a disc drive, and more particularly to an apparatus that corrects weight imbalance (simply referred to as "imbalance" hereinafter) around an axis of the spindle motor. The present invention is suitable, for example, for an apparatus that corrects the disc rotating balance in a hard disc drive ("HDD").

Along with the recent spread of the Internet etc., a demand for fast recording of a large amount of information is growing. A magnetic disc drive, such as an HDD, is required to have a larger capacity and an improved response. For the larger capacity, the HDD narrows a track pitch on the disc and increases the number of installed discs. For the improved response, use of a higher speed spindle motor is promoted.

The high-density disc requires highly precise head positioning. It is thus necessary to restrain vibrations applied to and deformations of the discs, and to correct imbalance around the spindle motor axis. A primary factor of the imbalance is an imbalance between the disc and the spindle hub. A method of moving the disc to a balanced position is one known imbalance correcting method.

In the HDD that mounts plural discs 24 around the spindle hub 32 of the spindle motor 30, the imbalance occurs when an interval (positional relationship) between each disc 24 and the hub 32 is not equally set unlike FIG. 10. FIG. 11 is a schematic sectional view showing a relationship between the hub 32 and a pair of discs 24 that have imbalance. In FIG. 11, the upper disc 24 is likely to move in the right arrow direction, the lower disc 24 is likely to move in the left arrow direction, and a moment applies to the hub 32. When the hub 32 receives the moment, the disc 24 vibrates and it becomes difficult to position a head (not shown). A large imbalance amount causes a collision between the head and the disc, a damage of the head, and a loss of data on the disc 24.

FIG. 12 is a schematic sectional view of a conventional balance corrector 10. The balance corrector 10 detects the vibration of a housing or disc enclosure base 22 when a pair of discs 24 are rotated with the spindle hub 32 of the spindle motor 30 in the pre-assembled HDD 20. If the vibration exists, an acceleration sensor 16 outputs a waveform W as shown in FIG. 13. If there is no vibration, the output becomes almost 0. In FIG. 13, the ordinate axis represents the imbalance amount (output of the acceleration sensor 16), and the abscissa axis represents time. It is known that the waveform W is output when the imbalance exists. The balance corrector 10 is mounted with a housing 22 via a rubber member 14 on a plate 12 supported on a base F. The rubber member 14 have an L shape, and the right side surface of the convex is restricted by an inner surface of a right sidewall 12b of the plate 12. The left side surface of the convex contacts a right side surface 22b of the housing 22. An impact applicator 14 fixed onto a left sidewall 12a of the plate 12 contacts an outer side of a left side surface 22a of the housing 22. The acceleration sensor 16 is attached to a right side surface 22b of the housing 22. The impact applicator 14 applies an antiphase impact to the housing 22 so that the output of the acceleration sensor 16 shown in FIG. 13 becomes 0. The impact applicator 14 typically has a cylindrical shape and uses a piezoelectric element.

Other prior art include, for example, Japanese Patent Applications, Publication Nos. 10-134502 and 11-39786.

Disadvantageously, the conventional balance corrector 10 cannot correct the imbalance with high precision. Firstly, the output (amplitude) of the acceleration sensor 16 is weak as shown in FIG. 13. This is because the impact applicator 14 is made of ceramic and has high rigidity, reducing the vibration of the housing 22 which the impact applicator 14 contacts. As a result, the output of the acceleration sensor 16 is subject to noises, and the measurement precision and finally the imbalance correction precision lower. Secondly, since the acceleration sensor 16 is attached directly to the housing 22, the measurement precision lowers. First of all, the acceleration sensor 16 is attached directly to the housing 22, and directly receives the impact from the impact applicator 14. This impact shifts the internal condition of the acceleration sensor 16 from its optimized state, increases the noise component, and lowers the measurement precision. In addition, the imbalance-corrected housing 22 is detached from the balance corrector 10 to complete the HDD 20 by mounting other components on the housing 22. Then, another housing 22 is attached to the balance corrector 10. Therefore, in attaching the housing 22 to and detaching the housing 22 from the balance corrector 10, the acceleration sensor 10 must be arduously attached and detached. The attachment error or attachment/detachment impacts shift the internal condition of the acceleration sensor 16 from the optimized state, increases the noise component, and lowers the measurement precision. Thirdly, the impact applicator 14 that uses a piezoelectric element surface-contacts the housing 22, the alignment between them after the housing 22 is mounted is arduous. In addition, the insufficient alignment cannot correct the waveform W shown in FIG. 13, or needs a long time to correct it.

Each of the balance correctors disclosed in Japanese Patent Applications, Publication Nos. 10-134502 and 11-39786 fixes on a table a base mounted with an impact applicator that uses a piezoelectric element, and applies the impact to the plate that supports the disc drive housing. Therefore, the vibration of the spindle motor is reduced by the impact applicator. The acceleration sensor is attached to the plate, and directly receives the impact of the impact applicator.

BRIEF SUMMARY OF THE INVENTION

The present invention is directed to an apparatus that can highly precisely correct the imbalance and a manufacturing method of a disc drive.

An apparatus according to one aspect of the present invention that corrects a weight imbalance around an axis of a spindle motor that rotates a disc in a disc drive includes an impact applicator that applies an impact to a housing that houses the spindle motor and the disc, a plate that supports the housing and impact applicator, a spring member that supports the plate, and enables the plate and the housing to vibrate together when the spindle motor rotates; and a detector that detects a vibration of the housing when the spindle motor rotates. According to this balance corrector, the spring member enables the plate and the housing to vibrate together, and prevents the impact applicator from reducing the housing vibration, maintaining a sufficiently high output or amplitude of the detector. As a result, the output of the detector is less affected by the noise, and the measurement precision improves. Preferably, the spring member has a spring constant k that satisfies $\omega o \leq \omega p = \sqrt{k/m}$, where m is a total weight supported by the spring member, ωo is a rotating frequency of the spindle motor, and ωp is a resonance frequency of the housing and plate. This condition prevents an attenuation or reduction of the vibration of the spindle motor.

An apparatus according to another aspect of the present invention that corrects a weight imbalance around an axis of a spindle motor that rotates a disc in a disc drive includes a detector that detects a vibration of the housing when the spindle motor rotates, the detector being provided apart from a housing that houses the spindle motor and the disc. Since the apparatus separates the detector from the housing, the detector is not affected by the impact applied by the housing. In addition, the detection precision of the detector is not affected by the attachment and detachment of the housing. Moreover, in detaching and attaching the housing, the detachment and attachment of the detector are unnecessary, improving the operability.

An apparatus according to still another aspect of the present invention that corrects a weight imbalance around an axis of a spindle motor that rotates a disc in a disc drive includes an impact applicator that point-contacts and applies an impact to a housing that houses the spindle motor and the disc. According to this balance corrector, the impact applicator point-contacts the housing, and eliminates an alignment that would be otherwise required in the prior art in which they surface-contact each other, thereby improving the operability. The impact applicator can stably apply a predetermined impact force to the housing, improving the imbalance correction precision.

An apparatus according to still another aspect of the present invention that corrects a weight imbalance around an axis of a spindle motor that rotates a disc in a disc drive includes an impact applicator that applies an impact to a housing that houses the spindle motor and the disc, a detector that detects a vibration of the housing when the spindle motor rotates, and a controller that obtains rotational phase information directly from the spindle motor and a detection result from the detector, and controls an impact force and impact application timing by the impact applicator based on the rotational phase information and detection result. According to this balance corrector, the controller obtains the rotational phase information directly from the spindle motor, and eliminates the conventional optical sensor. In comparison with a conventional mechanical index that obtains the rotational phase information indirectly, the correction precision improves, and the balance corrector can be made small and inexpensive.

A manufacturing method according to another aspect of the present invention of a disc drive that rotates plural discs using a spindle motor and records information in and reproduces the information from the discs includes the steps of leaning the plural discs to the same side of the spindle motor, and correcting a weight imbalance around an axis of the spindle motor by using the above apparatus. This manufacturing method leans the plural discs to the same side of the spindle motor, and cancels out a difference in frictional force, facilitating the balance correction. The leaning step may incline the plural discs or pushes edges of the discs towards the same direction.

Other objects and further features of the present invention will become readily apparent from the following description of the preferred embodiments with reference to accompanying drawings.

BRIEF DESCRIPTION OF THE DRAWINGS

FIG. 6 is a schematic sectional view for explaining leaning of the discs to one side using a jig.

DETAILED DESCRIPTION OF THE PREFERRED EMBODIMENTS

Figure 1:
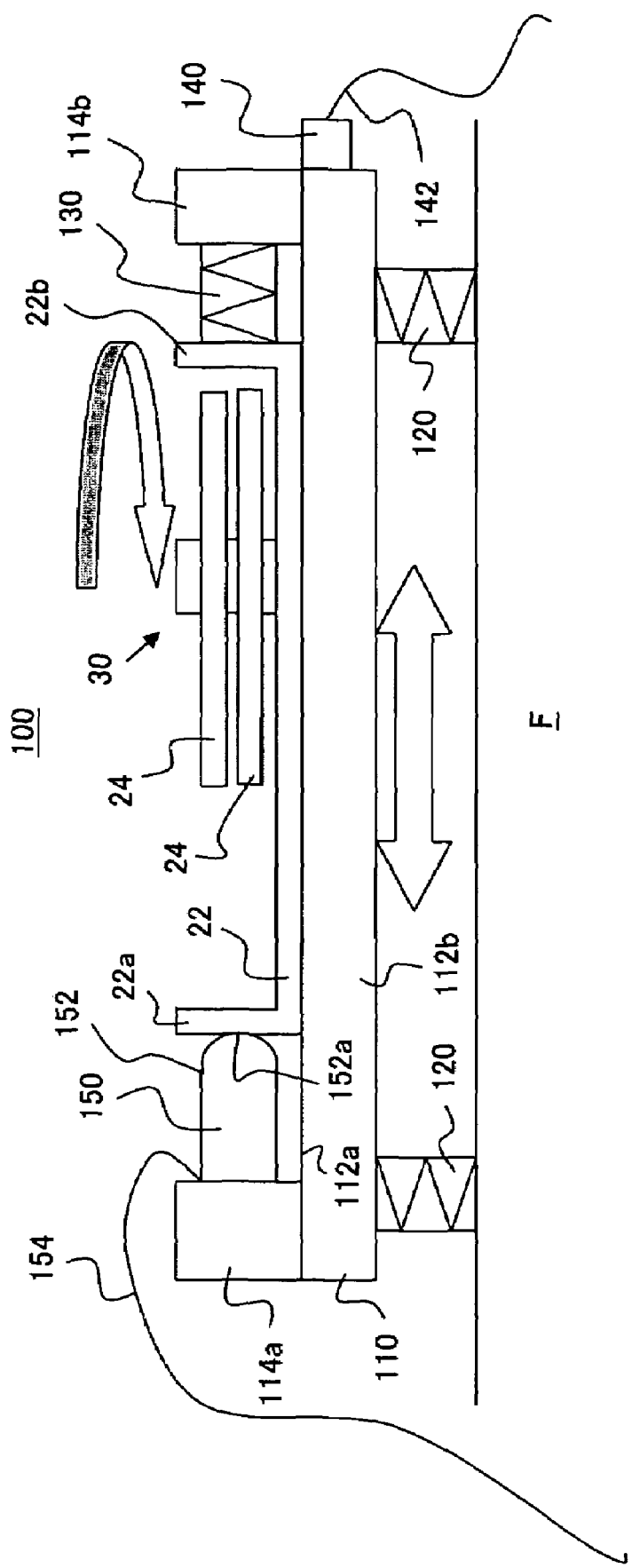
FIG. 1 is a schematic sectional view of a balance corrector according to one aspect of the present invention.
Figure 7:
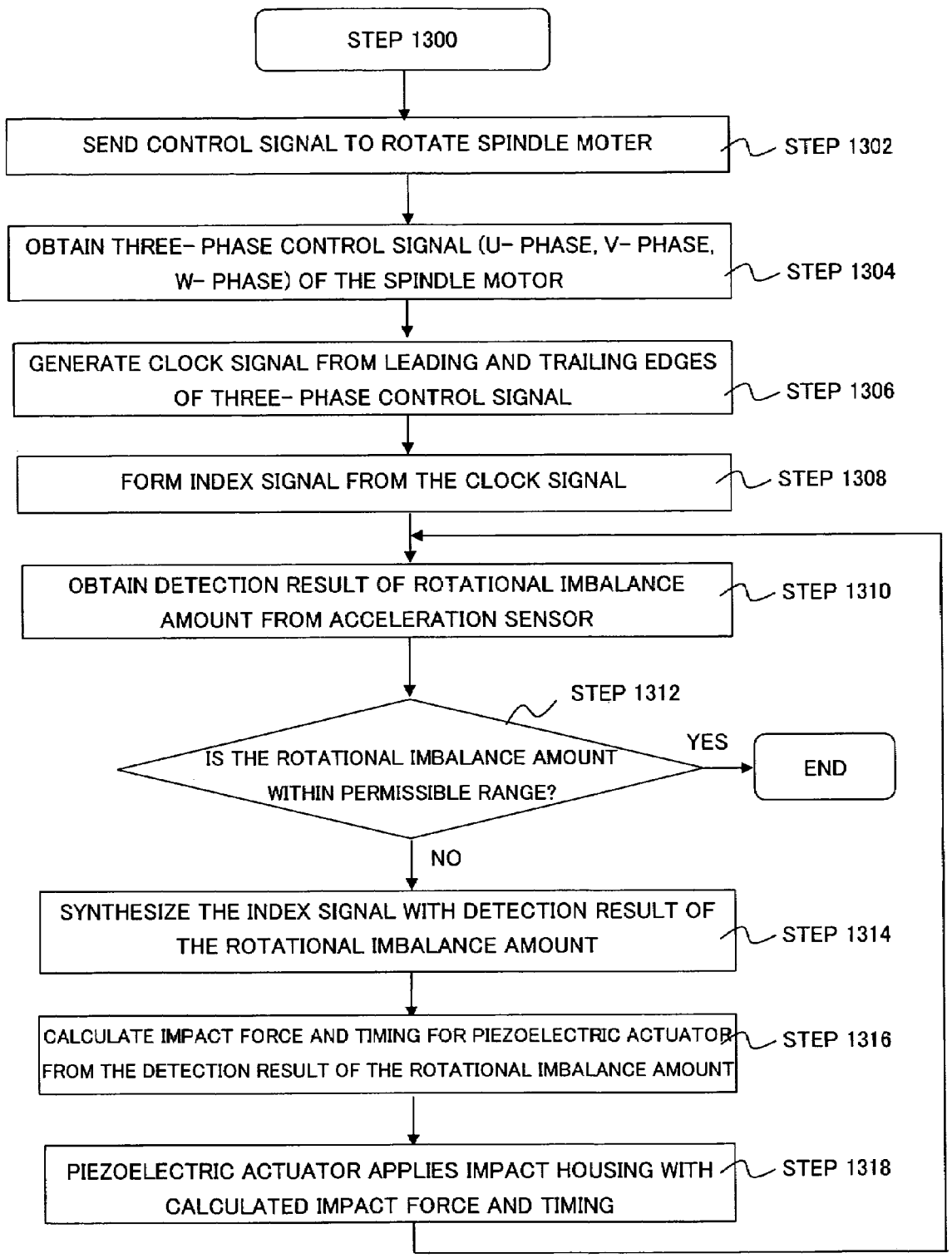
FIG. 7 is a flowchart of an inventive balance correcting method executed by a controller shown in FIG. 2.

Referring now to FIG. 1, a balance corrector 100 will be described. Here, FIG. 7 is a schematic sectional view of the balance corrector 100. The balance corrector 100 detects and corrects imbalance so that the imbalance amount falls within a permissible range. The imbalance is recognized as a vibration of a housing (or disc enclosure base) 22 when a pair of discs 24 are rotated with the spindle hub 32 of the spindle motor 30 in the pre-assembled HDD 20. Therefore, the balance corrector 100 detects and corrects the vibration of the housing 22. While this embodiment provides two discs 24, the number of discs 24 is not limited to two.

The balance corrector 100 includes, as shown in FIG. 1, a plate 110, plural spring members 120, a compression spring 130, an acceleration sensor (detector) 140, a piezoelectric actuator 150, and a controller 160 (not shown in FIG. 7).

The plate 110 is a box member made of a material, such as aluminum and stainless steel, and supports the housing 22 that houses plural discs 24 and the spindle motor 30. The plate 110 has a rectangular bottom surface, and has sidewalls 114a and 114b around a front surface 112a. FIG. 1 shows only the left sidewall 114a and the right sidewall 114b. A bearing and rubber may be inserted between the surface 112a of the plate 110 and the housing 22. The plate 110 supports the piezoelectric actuator 150 (impact applicator) and the housing 22.

The spring member 120 serves to prevent attenuation of the vibration when the spindle motor 30 is driven, and supports the plate 110. The spring members 120 enable the plate 110 to integrally vibrate with the housing 22. In the conventional balance corrector 10, only the housing 22 vibrates and the vibration is reduced by the ceramic impact applicator 14. Therefore, the acceleration sensor 16 has a difficulty in detecting the vibration. On the other hand, the balance corrector 100 enables the housing 22 and the plate 110 that supports the piezoelectric actuator 150 to vibrate together, preventing the reduction of the vibration when the spindle motor 30 rotates.

Four spring members 120 are connected to both the floor F and four points of the bottom surface 112b of the plate 110 symmetrically. The rectangle made by connecting centers of four spring members 120 is similar to the bottom rectangular of the plate 110. The center (or center of gravity) of the rectangle made by connecting centers of four spring members 120 approximately accords with the center of gravity of the plate 110 and the components mounted on the plate 110. Of course, the number of spring members 120 is not limited.

The spring member 120 has a spring constant k that satisfies the following Equation 1, where m is a total weight supported by or above the spring member 120, $\omega o$ is a rotating frequency of the spindle motor 30, and $\omega p$ is a resonance frequency of the housing 22 and plate 110.

$$\omega o \leq \omega p = \sqrt{k/m} \quad \text{[EQUATION 1]}$$

Equation 1 can prevent a reduction of the vibration of the spindle motor 30. If $\omega o = \omega p$ is met, the amplitude of the waveform shown in FIG. 9, which will be described later, becomes excessively large due to the resonance. Thus, the following equation is preferably met:

$$\omega o < \omega p \quad \text{[EQUATION 2]}$$

In the range that satisfies Equation 2, the vibration of the spindle motor 30 does not reduce and the amplitude of the waveform shown in FIG. 9, which will be described later, becomes constant. For plural spring members 120, k is a combined spring constant, and satisfies the following Equation 3, where $k_1$ is a spring constant of the first spring member 120, $k_2$ is a spring constant of the second spring member 120, $k_3$ is a spring constant of the second spring member 120, . . . .

$$\frac{1}{k} = \frac{1}{k_1} + \frac{1}{k_2} + \frac{1}{k_3} + \Lambda \quad \text{[EQUATION 3]}$$

One end of the compression spring 130 is engaged with the sidewall 114b, and the other end of the compression spring 130 is engaged with the outer side of the right side surface 22b of the housing 22. The compression spring 130 applies a force to the housing 22 against the piezoelectric actuator 150. The spring constant of the compression spring 130 is not limited, but is stronger than the spring constant of the spring member 120. Instead of the compression spring 130, the rubber 14 may be used. The number of compression springs 130 and the arrangement of the compression spring 130 are not limited, but the compression spring 130 is preferably arranged so that no moment is applied to the housing 22 when the impact applied to the housing 22.

The acceleration sensor 140 detects the vibration of the housing 22 and the plate 110 when the spindle motor 30 is driven. The acceleration sensor 140 is mounted on the plate 110, and spaced from the housing 22. Therefore, the acceleration sensor 140 is not affected by the impact applied by the piezoelectric actuator 150 to the housing 22. The detection precision of the acceleration sensor 140 is not affected by the attachment and detachment of the housing 22. In addition, in the attachment and detachment of the housing 22, the attachment and detachment of the acceleration sensor 140 are not necessary, improving the operability. The spring members 120 maintain such a sufficiently high output of the acceleration sensor 140 that it is less influential to noises, improving the measurement precision.

The piezoelectric actuator (or hammer) 150 uses a piezoelectric element and point-contacts the side surface 22a of the housing 22. The piezoelectric actuator 150 is an impact applicator that corrects the imbalance by applying the impact to the housing 22. The point contact of the piezoelectric actuator 150 with the housing 22 eliminates an alignment that would be otherwise required for Japanese Patent Applications, Publication Nos. 10-134502 and 11-39786 in which they surface-contact each other, thereby improving the operability. In FIG. 1, the piezoelectric actuator 150 has a semispherical tip 152 that has a vertex 152a for contact with the housing 22. The piezoelectric actuator 150 can stably apply a predetermined impact force to the housing 22, improving the balance correction precision. While this embodiment provides the semispherical tip 152 to the piezoelectric actuator 150, a semispherical cap may be attached to a cylindrical piezoelectric actuator 150.

Figure 2:
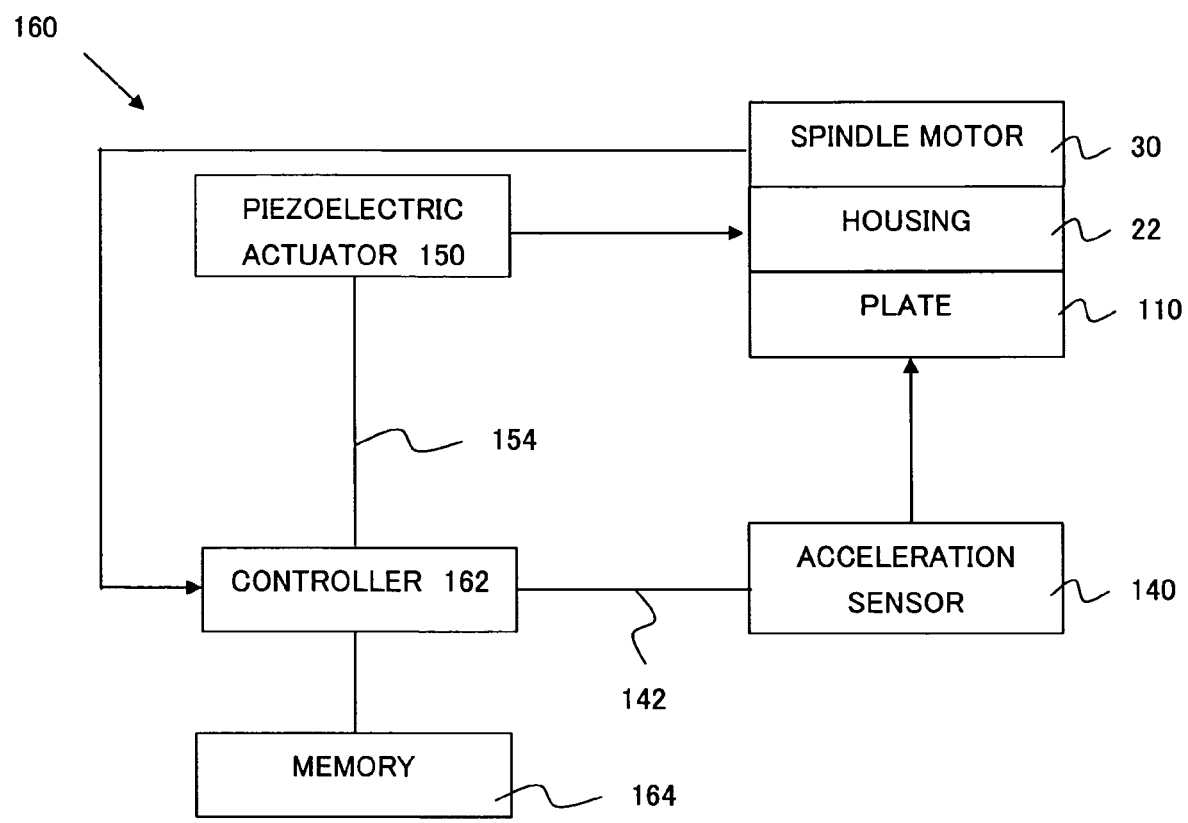
FIG. 2 is a block diagram of a control system of the balance corrector shown in FIG. 1.

The control system 160 includes, as shown in FIG. 2, a controller 162, and a memory 164. The controller 162 is connected to the spindle motor 30 and the memory 164. The controller 162 is connected to the acceleration sensor 140 via a signal line 142, and connected to the piezoelectric actuator 150 via a signal line 154. The controller 162 controls each component in the balance corrector 100, and executes the balance correcting method, which will be described later. The memory 164 includes a ROM and a RAM, and stores the balance correcting method, which will be described later, and the permissible balance amount of the disc 24.

Figure 3:
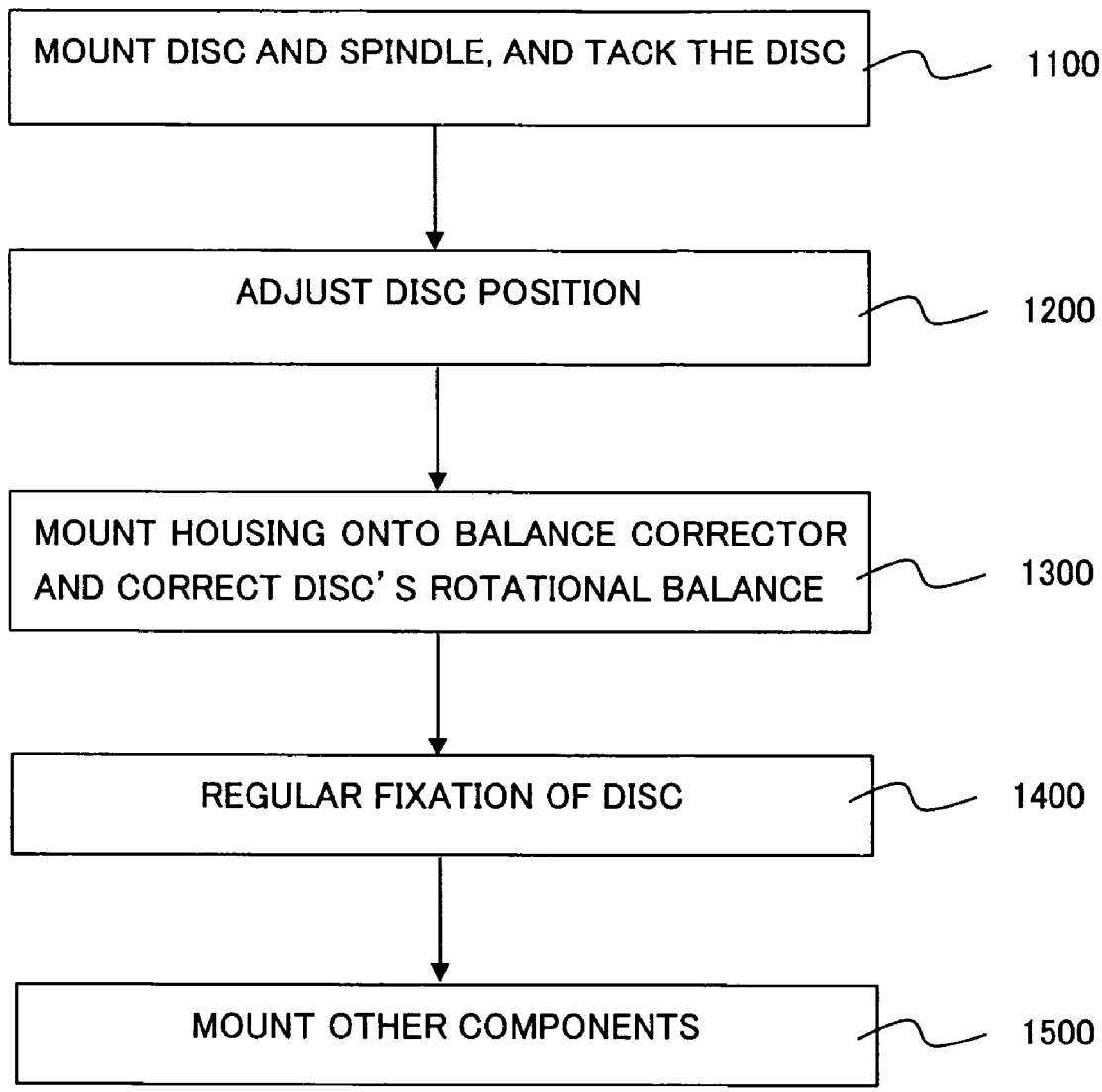
FIG. 3 is a flowchart for explaining a manufacturing method of the HDD according to another aspect of the present invention.

Referring now to FIG. 3, a description will be given of a manufacturing method of the HDD. First, the spindle motor 30 and a pair of discs 24 are mounted on the housing 22, and discs 24 are tacked or provisionally fixed (step 1100). More specifically, the spindle motor 30 is attached to the housing 22, and then a pair of discs 24 are attached to the spindle motor 30.

Figure 4:
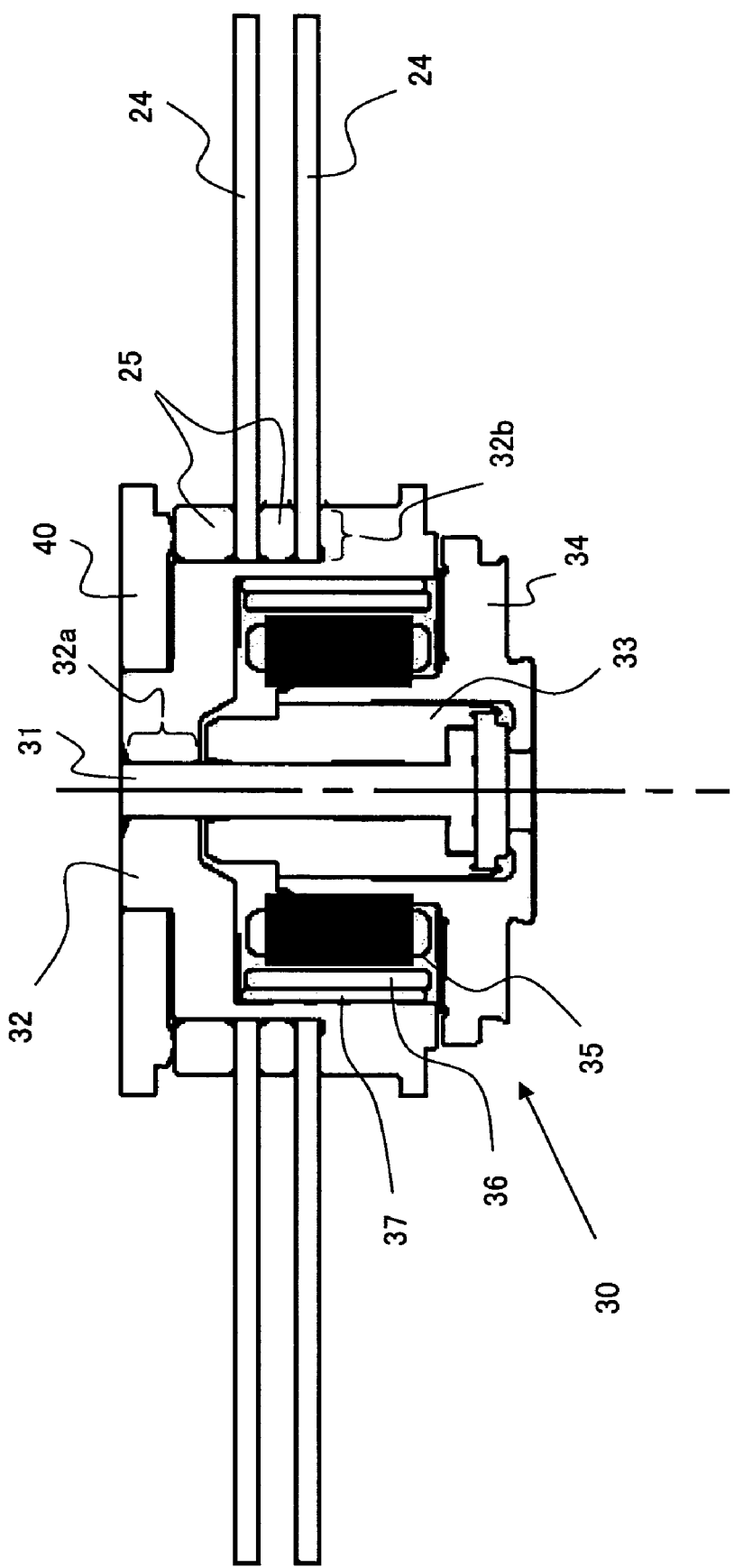
FIG. 4 is a sectional view of a pair of discs mounted on the spindle motor in one step shown in FIG. 3.

The spindle motor 30 has, as shown in FIG. 4, a shaft 31, a hub 32, a sleeve 33, a bracket 34, a core 35, and a magnet 36, a yoke 37, and other members, such as a thrust bearing, radial bearing, and lubricant oil (fluid). Here, FIG. 4 is a longitudinal sectional view of the detailed spindle motor 30. The shaft 31 rotates with the discs 24 and the hub 32. The hub 32 is fixed onto the shaft 31 at its top 32a, and supports the disc 24 on its flange 32b. The sleeve 33 is a member that allows the shaft 31 to be mounted rotatably. The sleeve 33 is fixed in the housing 22. While the shaft 31 rotates, the sleeve 33 does not rotate and forms a fixture part with the bracket 34. The bracket (base) 34 is fixed onto the housing 22 around the sleeve 33, and supports the core (coil) 35, the magnet 36, and a yoke 37. The current flows through the core 35, and the core 35, the magnet 36, and the yoke 37 constitute a magnetic circuit.

The lower disc 24 is mounted on the flange 32b, then the upper disc 24 is mounted via the spacer 25, and a clamp ring 40 is mounted via the spacer 25. The clamp ring 40 serve to clamp the discs 24 and the spacers 25 onto the spindle motor 30. The clamp ring 40 does not have a perforation hole through for the detection light from an optical sensor to pass. As described later, a controller 162 obtains a state signal or a three-phase signal from a spindle motor 30 directly, not indirectly from the optical sensor or mechanical index. As a result, the correction precision improves, and a balance corrector 100, which will be described later, can be made small and inexpensive.

The spacer 25 maintains an interval between the discs 24. The clamp ring 40 is screwed onto the hub 32. In FIG. 4, the screws are inserted into the clamp ring 40 and cannot be seen. In the provisional fixation, the clamp ring 40 fixes the discs 24 at such an axial force that the impact applied by the piezoelectric actuator 150 does not destroy the spindle motor 30. On the other hand, the clamp ring 40 fixes the discs 24 at such an axial force that the discs 24 do not shift in the rotation of the spindle motor 30 and the impact applied by the piezoelectric actuator 150 can correct the imbalance.

Figure 11:
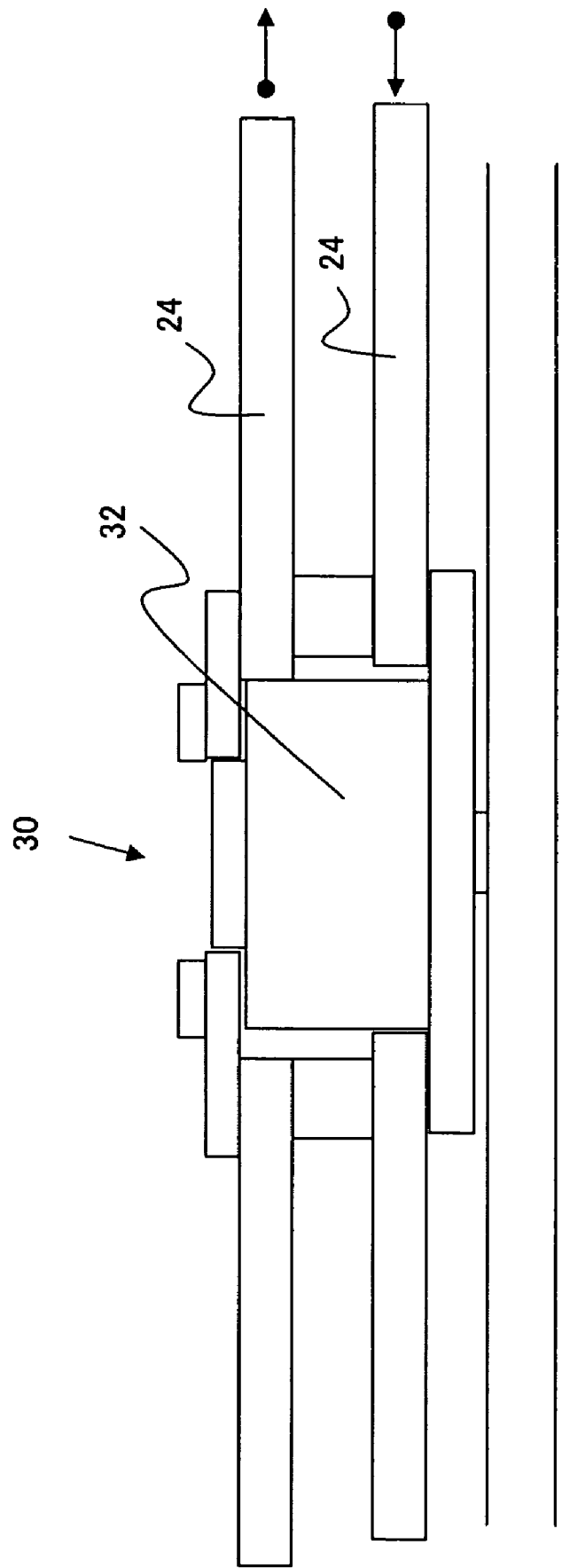
FIG. 11 is a schematic sectional view of the discs and spindle motor that have imbalance.
Figure 12:
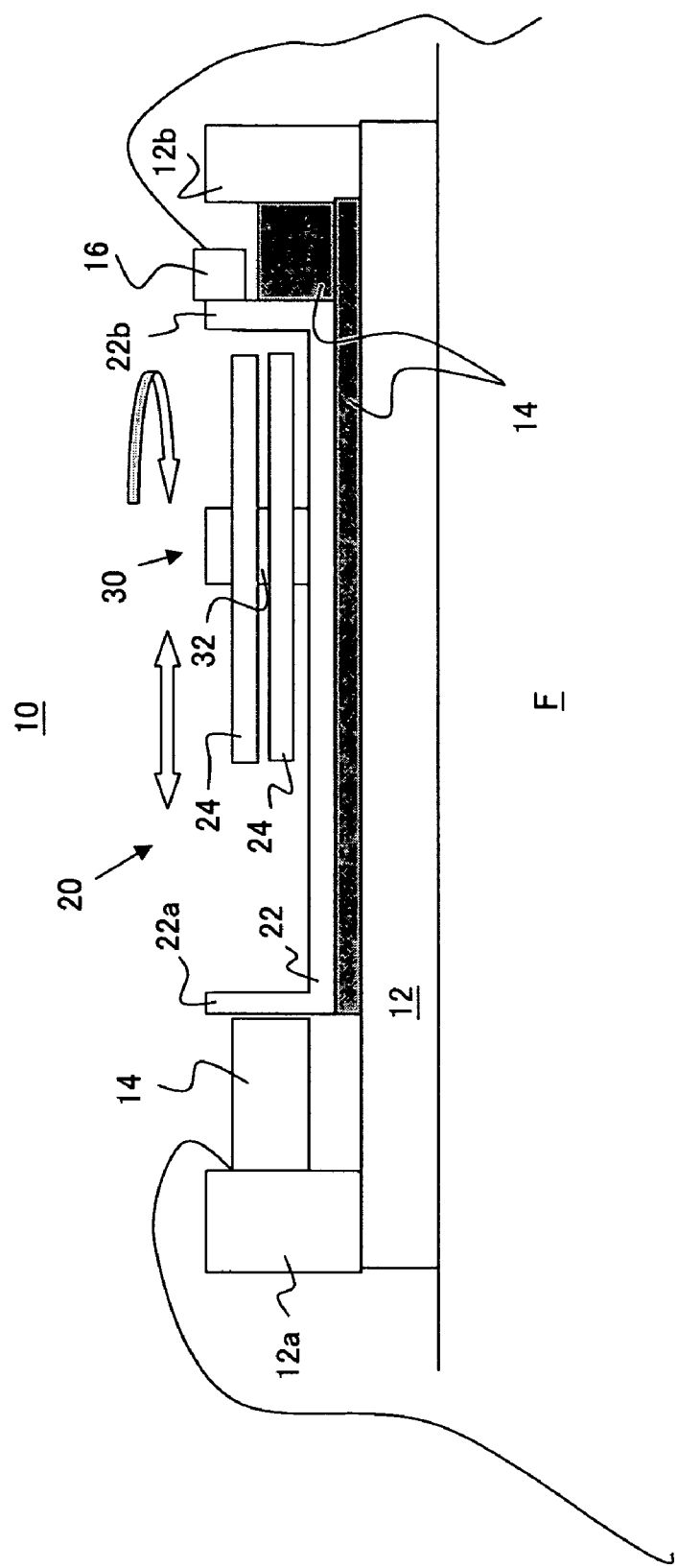
FIG. 12 is a schematic block diagram of a conventional balance corrector.

Next, a position of the disc 24 is adjusted (step 1200). This embodiment puts or leans the discs 24 to the same side of the hub 32 of the spindle motor 30. According to the experiments by the instant inventors, the balance corrector 100 has a difficulty in moving the discs 24 due to a difference of a frictional force between the discs 24 when the plural discs 24 are alternately arranged as shown in FIG. 11. On the other hand, when all discs 24 are aligned with the same direction or lean to the same side, as shown in FIG. 6, a difference of a frictional force is 0 among the discs 24, and the adjustment by the balance corrector 100 becomes easier.

Figure 5B:
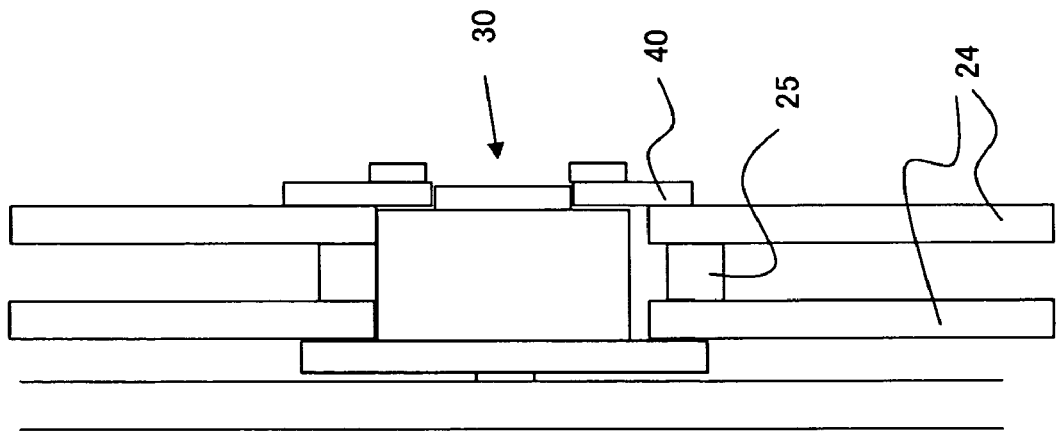
FIGS. 5A and 5B are schematic sectional views for explaining leaning of the discs to one side using their self-weights.
Figure 5A:
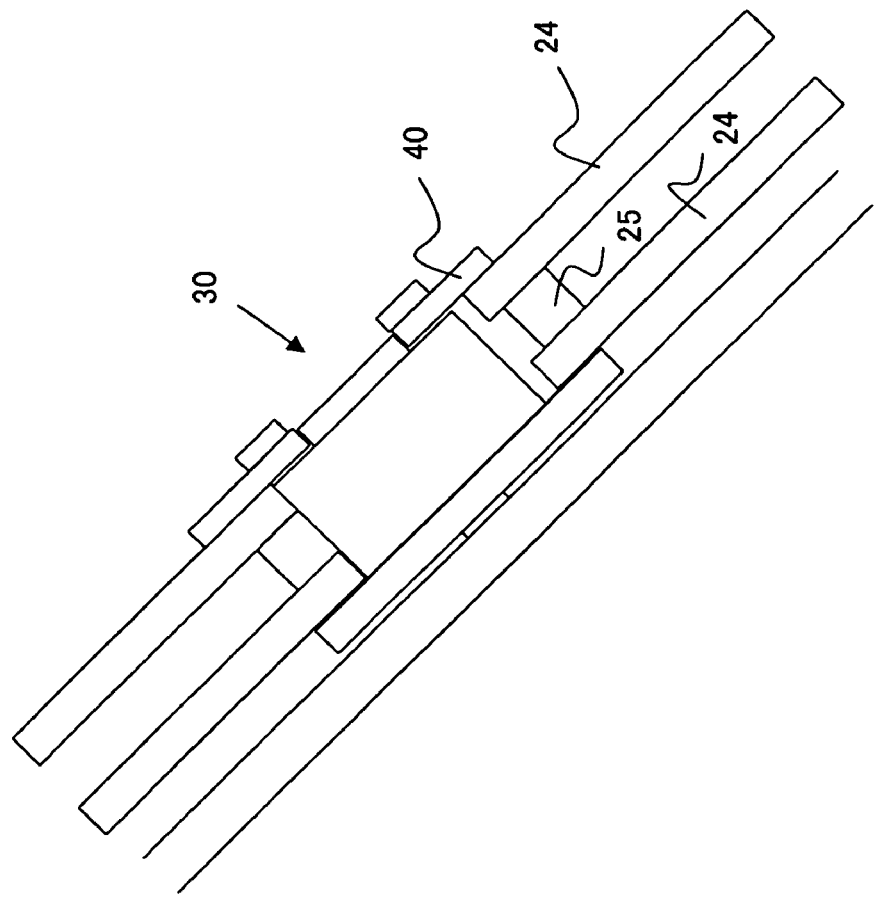

A method of leaning the discs 24 to the same side may use the self-weights of the discs 24 by inclining the housing 22, as shown in FIGS. 5A and 5B. FIG. 5A is a schematic sectional view of the housing 22 inclined by about 45°. FIG. 5B is a schematic sectional view of the perpendicularly inclined housing 22. Alternatively, as shown in FIG. 6, a jig may be used to lean the plural discs 24 to the same side as shown by arrows. FIG. 6 is a schematic sectional view for explaining a method of leaning the discs 24 to the same side using the jig.

Next, the housing 22 is mounted onto the balance corrector 100, and the rotational balance of the discs 24 is corrected (step 1300). Referring now to FIG. 7, a description will be given of the balance correcting method executed by the controller 162. Here, FIG. 7 is a flowchart of the balance correcting method.

Figure 8:
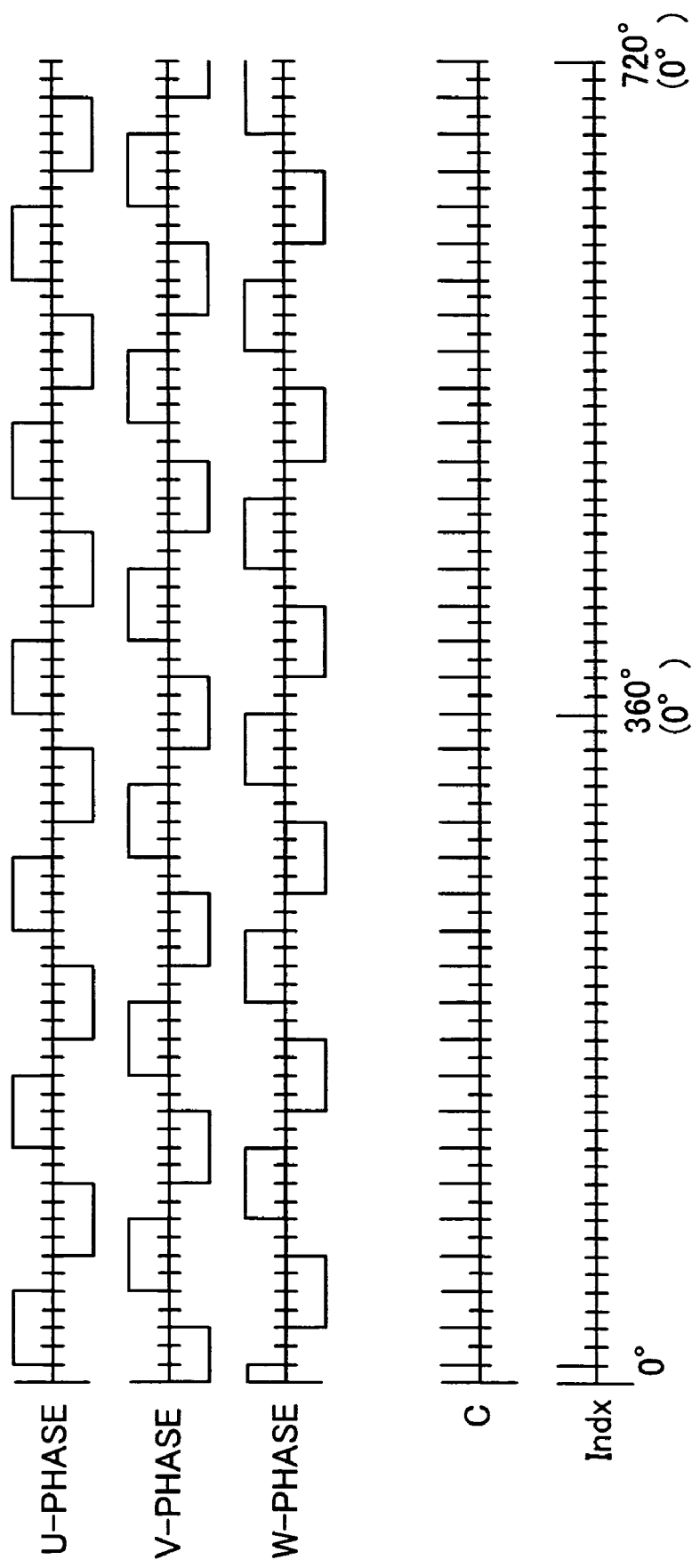
FIG. 8 is a timing chart among a three-phase control signal of the spindle motor obtained by the controller shown in FIG. 2, a clock signal and an index signal.

First, the controller 162 sends a control signal to the spindle motor 30 to rotate it in the state of FIG. 1 (step 1302). As a result, the spindle motor 30 rotates with the discs 24 in the arrow direction shown in FIG. 1. The spindle motor 30 of this embodiment is a three-phase nine-pole motor. When the controller 162 sends a rotating command to the spindle motor 30, the spindle motor 30, in response, sends a three-phase signal (U-phase, V-phase, W-phase) to the controller 162 (step 1304). FIG. 8 shows each signal. Next, the controller 162 generates a clock signal C from the leading and trailing edges of the three-phase signal (step 1306). FIG. 8 also shows the clock signal C that corresponds to at least one of the leading and tailing edges of the three-phase signal.

Next, the controller 162 forms an index signal Indx (rotating phase difference information) from the clock signal (step 1308). FIG. 8 also shows the index signal Indx. It is known that which clock corresponds to 360° from the structure of the spindle motor 30, i.e., three-phase nine-pole motor.

Figure 13:
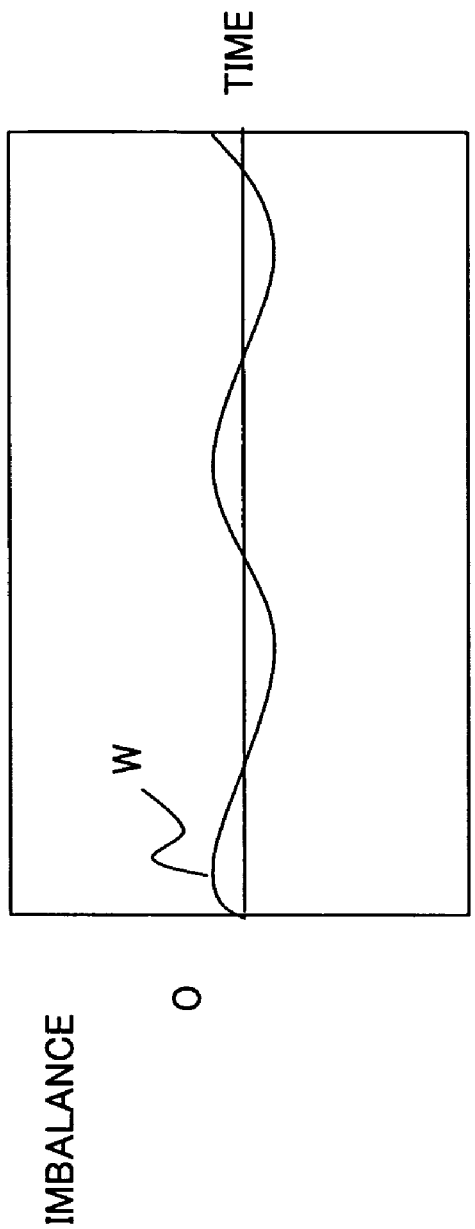
FIG. 13 is a graph showing an output of an acceleration sensor in the balance corrector shown in FIG. 13.

Next, the controller 162 obtains a detection result of the imbalance amount from the acceleration sensor 140 (step 1310). FIG. 9 shows a detection result of the imbalance amount, in which the ordinate axis represents the imbalance amount (acceleration), and the abscissa axis represents the time. In comparison with FIG. 13, it is understood that the output (amplitude) of the acceleration sensor 140 becomes stronger. Thereby, the output is less subject to the noise, and the detection precision improves.

Next, the controller 162 determines whether the imbalance amount of the discs 24 detected by the acceleration sensor 140 falls within the permissible range stored in the memory 164 (step 1312). When the controller 162 determines that the imbalance amount falls within the permissible range (step 1312), the controller 162 ends the process. The permissible range is a predetermined range in which the amplitude of the vibration waveform is close to 0.

Figure 9:
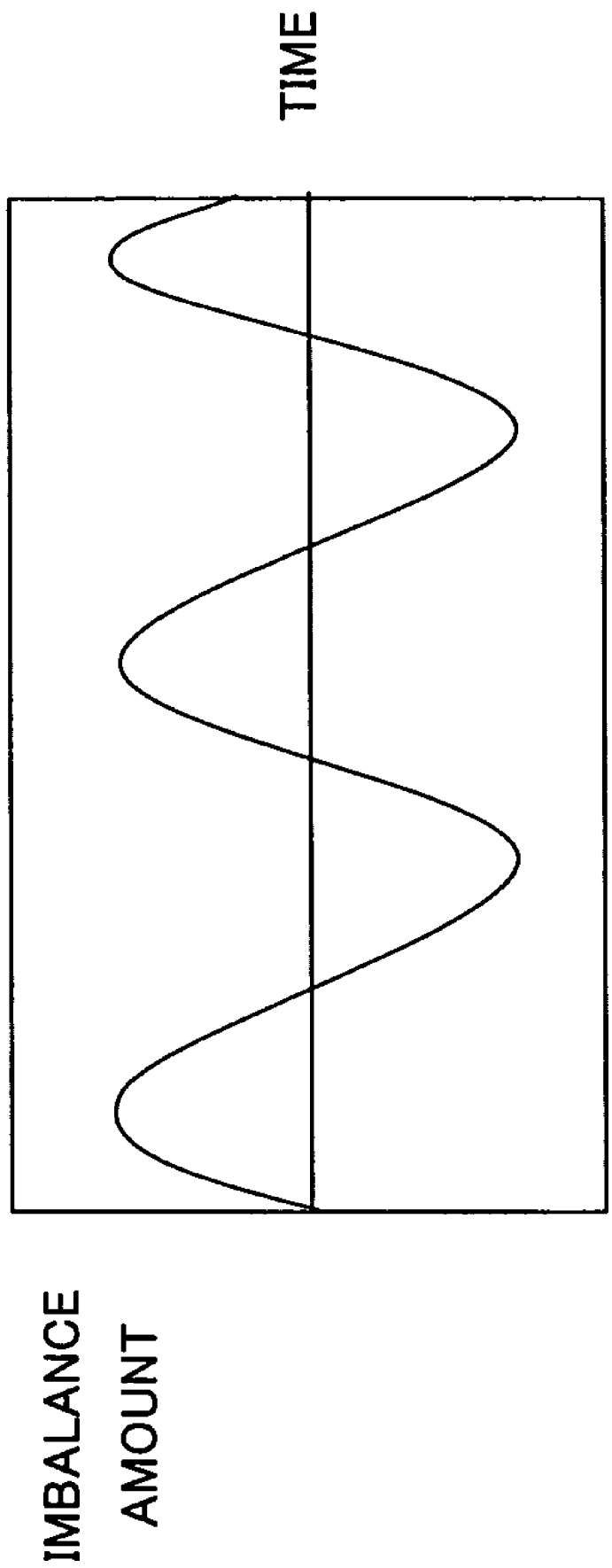
FIG. 9 is a graph showing an output of an acceleration sensor in the balance corrector shown in FIG. 1.
Figure 10:
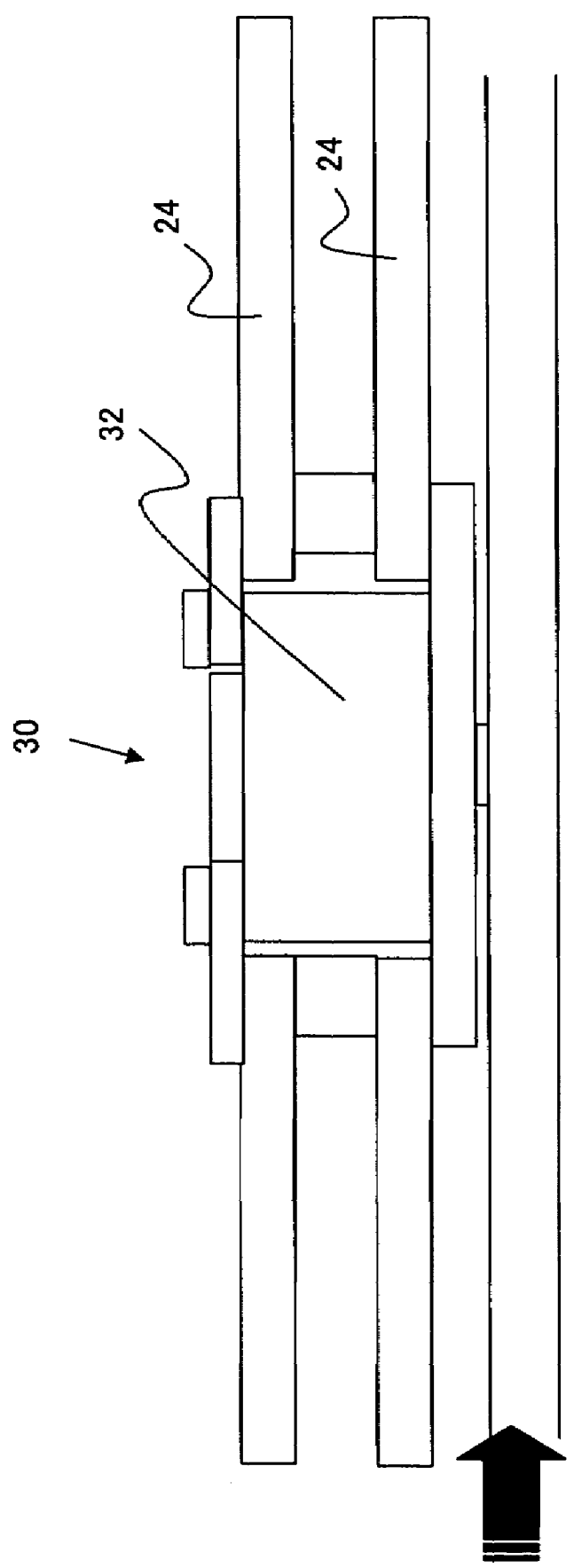
FIG. 10 is a schematic sectional view of the discs and spindle motor that have no imbalance.

On the other hand, when the controller 162 determines that the imbalance amount is outside the permissible range (step 1312), the controller 162 detects the shift amount of the waveform in the abscissa axis direction in FIG. 9 from the index signal Indx (step 1314). As a result, the rotating angle of the spindle motor 30 at the peak value of the sine curve is detected.

Next, the controller 162 calculates the impact force and impact application timing by the piezoelectric actuator 150 from the detection result of the imbalance amount shown in FIG. 9 (step 1316). In other words, the controller 162 obtains a value that inverts the peak value from FIG. 9, and the timing for it (or a corresponding clock) from FIG. 8. Next, the controller 162 controls the piezoelectric actuator 150, and applies the impact to the housing 22 at the calculated impact force and timing (step 1318). The impact is applied in the arrow direction in FIG. 1. Thereafter, the flow returns to the step 1310.

Turning back to FIG. 3, the clamp ring 251 is finally or regularly fixed in the balance-corrected housing 22 so as to tightly fix the discs 24 (step 1400). In the regular fixation, the clamp ring 251 fixes the discs 24 at such an axial force that the impact applied by the piezoelectric actuator 150 cannot shift the discs 24 or the impact guaranteed by the HDD 20 can be maintained.

Next, the HSA 210 and other components are mounted in a clean room, then the printed board and other component are attached to the back surface of the housing 22, and the HDD 20 is completed (step 1500). The completed HDD 20 can guarantee high head positioning precision.

Further, the present invention is not limited to these preferred embodiments, and various modifications and variations may be made without departing from the spirit and scope of the present invention. While this embodiment discusses the HDD, the present invention is applicable to another type of magnetic disc drive, such as a magneto optic disc drive.

What is claimed is:

1. An apparatus that corrects a weight imbalance around an axis of a spindle motor that rotates a disc in a disc drive, said apparatus comprising:
    an impact applicator that applies an impact to a housing that houses the spindle motor and the disc;
    a plate that supports said housing and impact applicator;
    a fixture member mounted on said plate and configured to fix the impact applicator, the impact applicator being located between said fixture member and said housing;
    a spring member that supports said plate, and enables said plate and said housing to vibrate together when the spindle motor rotates; and
    a detector that detects a vibration of the housing when the spindle motor rotates.

2. An apparatus that corrects a weight imbalance around an axis of a spindle motor that rotates a disc in a disc drive, said apparatus comprising:
    an impact applicator that applies an impact to a housing that houses the spindle motor and the disc;
    a plate that supports said housing and impact applicator;
    a spring member that supports said plate, and enables said plate and said housing to vibrate together when the spindle motor rotates; and
    a detector that detects a vibration of the housing when the spindle motor rotates,
    wherein said spring member has a spring constant k that satisfies $\omega o \leq \omega p = \sqrt{k/m}$, where m is a total weight supported by said spring member, ωo is a rotating frequency of the spindle motor, and ωp is a resonance frequency of the housing and plate.

3. A manufacturing method of a disc drive that rotates plural discs using a spindle motor and records information in and reproduces the information from the discs, said manufacturing method comprising the steps of:

leaning the plural discs to the same side of the spindle motor; and correcting a weight imbalance around an axis of the spindle motor by using an apparatus that comprises an impact applicator that applies an impact to a housing that houses the spindle motor and the disc, a plate that supports said housing and impact applicator, a fixture member mounted on said plate and configured to fix the impact applicator, the impact applicator being located between said fixture member and said housing, a spring member that supports said plate, and enables said plate and said housing to vibrate together when the spindle motor rotates, and a detector that detects a vibration of the housing when the spindle motor rotates.

4. A method according to claim 3, wherein said leaning step inclines the plural discs or pushes edges of the discs towards the same direction.

* * * * *